US010685546B2

(12) United States Patent
Duric et al.

(10) Patent No.: US 10,685,546 B2
(45) Date of Patent: Jun. 16, 2020

(54) FIRE DETECTION USING THE SCATTERED LIGHT PRINCIPLE WITH A STAGGERED ACTIVATION OF A FURTHER LED UNIT FOR RADIATING IN FURTHER LIGHT PULSES WITH DIFFERENT WAVELENGTHS AND SCATTERED LIGHT ANGLES

(71) Applicant: Siemens Schweiz AG, Zürich (CH)

(72) Inventors: Aleksandar Duric, Zug (CH); Mathias Stäger, Menzingen (CH); Stefan Walker, Altdorf (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 16/327,379

(22) PCT Filed: Jul. 31, 2017

(86) PCT No.: PCT/EP2017/069320
§ 371 (c)(1),
(2) Date: Feb. 22, 2019

(87) PCT Pub. No.: WO2018/036754
PCT Pub. Date: Mar. 1, 2018

(65) Prior Publication Data
US 2019/0197857 A1    Jun. 27, 2019

(30) Foreign Application Priority Data
Aug. 25, 2016 (EP) .................... 16185789

(51) Int. Cl.
*G08B 17/107* (2006.01)
*G01J 1/08* (2006.01)
*G01J 1/42* (2006.01)

(52) U.S. Cl.
CPC ............ *G08B 17/107* (2013.01); *G01J 1/08* (2013.01); *G01J 1/4228* (2013.01); *G01J 2001/4238* (2013.01)

(58) Field of Classification Search
CPC ........ G08B 17/107; G01J 1/08; G01J 1/4228; G01J 2001/4238
(Continued)

(56) References Cited

U.S. PATENT DOCUMENTS 6,218,950 B1   4/2001  Politze et al. ............... 340/630
9,036,150 B2 *  5/2015  Wedler .................. G01N 21/53
                                                    356/338

(Continued)

FOREIGN PATENT DOCUMENTS

DE          199 02 319 A1   7/2000  ............. G06K 9/00
DE   10 2010 039 230 B3   1/2012  ............. G01N 21/53
(Continued)

OTHER PUBLICATIONS

International Search Report and Written Opinion, Application No. PCT/EP2017/069320, 20 pages, dated Oct. 19, 2017.

*Primary Examiner* — Roy M Punnoose
(74) *Attorney, Agent, or Firm* — Slayden Grubert Beard PLLC

(57) ABSTRACT

Various embodiments may include a method for fire detection comprising: radiating light at a first wavelength into a scattered light volume and measuring a radiation intensity generated by forward scattering; radiating light at a second wavelength and measuring a second scattered radiation intensity generated by forward scattering; determining a first quotient from the scattered radiation intensities and comparing it to a first and second value; and if the first quotient lies between the first and the second value; radiating pulses at the second wavelength into and measuring a third intensity generated by backward scattering; determining a second (Continued)

quotient from the first and third scattered radiation intensity and comparing the second quotient with a third value; and generating a fire alarm if the second quotient exceeds the third comparison value.

16 Claims, 5 Drawing Sheets

(58) Field of Classification Search
 USPC .......................................................... 356/438
 See application file for complete search history.

(56) References Cited

U.S. PATENT DOCUMENTS

| | | | |
|---|---|---|---|
| 2004/0066512 A1* | 4/2004 | Politze | G08B 17/107 356/338 |
| 2013/0135607 A1* | 5/2013 | Wedler | G01N 21/53 356/51 |
| 2013/0234856 A1 | 9/2013 | Cole | 340/630 |
| 2018/0061215 A1* | 3/2018 | Vollenweider | G08B 17/117 |
| 2019/0197857 A1 | 6/2019 | Duric et al. | |

FOREIGN PATENT DOCUMENTS

| | | | | |
|---|---|---|---|---|
| DE | 10 2011 119 431 A1 | 5/2013 | ........... | G08B 17/107 |
| EP | 1 408 469 A2 | 4/2004 | ........... | G08B 17/107 |
| EP | 1 619 640 A1 | 1/2006 | ........... | G08B 17/107 |
| EP | 1732049 A1 | 12/2006 | ............ | G08B 29/26 |
| EP | 1 884 904 A1 | 2/2008 | ........... | G08B 17/107 |
| EP | 2 336 993 A1 | 6/2011 | ............ | G01N 21/53 |
| WO | 03/027979 A1 | 4/2003 | ........... | G01N 21/53 |
| WO | 2018/036754 A1 | 3/2018 | ........... | G08B 17/107 |

\* cited by examiner

FIRE DETECTION USING THE SCATTERED LIGHT PRINCIPLE WITH A STAGGERED ACTIVATION OF A FURTHER LED UNIT FOR RADIATING IN FURTHER LIGHT PULSES WITH DIFFERENT WAVELENGTHS AND SCATTERED LIGHT ANGLES

CROSS-REFERENCE TO RELATED APPLICATIONS

This application is a U.S. National Stage Application of International Application No. PCT/EP2017/069320 filed Jul. 31, 2017, which designates the United States of America, and claims priority to DE Application No. 16185789.1 filed Aug. 25, 2016, the contents of which are hereby incorporated by reference in their entirety.

TECHNICAL FIELD

The present disclosure relates to fire detection. Various embodiments may include devices detecting fires according to the scattered light principle.

BACKGROUND

In detectors using the scattered light principle, light pulses of a first wavelength $\lambda_1$, for example of blue light or near UV light (UV-A) and light pulses of a second wavelength $\lambda_2$, or example of red light or near infrared light (NIR) are radiated into a common scattered light volume or measuring volume. In some examples, light-emitting diodes are used for radiating in the fight pulses. By means of a photosensor, for example, a photodiode or by means of a further photosensor, scattered radiation intensities which are generated by forward and backward scattering in the scattered light volume are measured. By means of suitable quotient formation from the measured scattered radiation intensities, it is possible to ascertain information regarding the size and nature of the particles detected in the scattered light volume.

Such methods are known, for example, from DE 10 2011 119 431 A1, EP 1 408 469 A2, from EP 1 884 904 A1 and from EP 2 336 993 A1. In EP 1 430 457 A1, a method is described in which a second light-emitting diode is only switched on when the scattered light signal originating from the first light-emitting diode has exceeded a minimum level.

SUMMARY

The teachings of the present disclosure describe an improved smoke detection method and/or a power-saving smoke detection method, and/or an improved and/or particularly power-saving scattered light smoke detector. For example, some embodiments include a method for fire detection according to the scattered light principle, having the following steps:

a) radiating light pulses of a first wavelength $\lambda_1$ into a scattered light volume (SV) and measuring a first scattered radiation intensity $I_{1F}$ generated by forward scattering in the scattered light volume (SV);

b) radiating light pulses of a second wavelength $\lambda_2$ into the scattered light volume (SV) and measuring a second scattered radiation intensity $I_{2F}$ generated by forward scattering in the scattered light volume (SV), wherein the second wavelength $\lambda_2$ is greater than the first wavelength $\lambda_1$, c) determining a first quotient Q1 from the first and second scattered radiation intensity $I_{1F}$, $I_{2F}$ and comparing the first quotient Q1 with a first and second comparison value F0, S0, wherein the first comparison value F0 is greater than the second comparison value S0, and d) if the first quotient Q1 lies between the first and the second comparison value F0, S0:

e) radiating light pulses of the second wavelength $\lambda_2$ into the scattered light volume (SV) and measuring a third scattered radiation intensity $I_{2R}$ generated by backward scattering in the scattered light volume (SV), f) determining a second quotient Q2 from the first and third scattered radiation intensity $I_{1F}$, $I_{2R}$ and comparing the second quotient Q2 with a third comparison value F, and g) outputting a fire alarm (AL) if the second quotient Q2 exceeds the third comparison value F.

In some embodiments, the method step e) already takes place together with the method step b) and/or the method step f) already takes place together with the method step c).

In some embodiments, if the first quotient Q1 reaches or exceeds the first comparison value F0, the method further includes:

h) radiating light pulses of the first wavelength $\lambda_1$ into the scattered light volume (SV) measuring a fourth scattered radiation intensity $I_{1R}$ generated by backward scattering in the scattered light volume (SV), i) determining a third quotient Q3 from the fourth and first scattered radiation intensity $I_{1R}$, $I_{1F}$ and comparing the third quotient Q3 with a fourth comparison value OF, and j) outputting a fire alarm for an open fire (AL-OF) if the third quotient Q3 exceeds the fourth comparison value OF, and k) otherwise, outputting a fire alarm for a smoldering fire (AL-SB).

In some embodiments, the method step h) already takes place together with the method step a) and/or the method step i) already takes place together with the method step c) of claim 1.

In some embodiments, in place of the third quotient Q3, a fourth quotient Q4 is determined from the fourth and second scattered radiation intensity $I_{1R}$, $I_{2F}$ and wherein the fourth quotient Q4 is compared with a fifth comparison value OF'.

In some embodiments, a fire alarm (AL) is output if the first quotient Q1 reaches or exceeds the first comparison value F0.

In some embodiments, the radiating-in of the light pulses of the second wavelength $\lambda_2$ and the measurement of the second and third scattered radiation intensity $I_{2F}$, $I_{2R}$ takes place only when the first scattered radiation intensity $I_{1F}$ exceeds a minimum scattered light level MIN for the smoke detection.

In some embodiments, the radiating-in of the light pulses of the first and second wavelength $\lambda_1$, $\lambda_2$ into the scattered light volume (SV) takes place at a higher repetition frequency if the first scattered radiation intensity $I_{1F}$ exceeds a minimum scattered light level MIN for the smoke detection.

In some embodiments, the first and second quotient Q1, Q2 are calibrated to an identical ratio value, preferably to a value of 2 and wherein the third and fourth quotient Q3, Q4 are calibrated to half of this identical ratio value, e.g., to a value of 1, for scattering particles with a mean diameter in the range of 0.5 to 1.5 μm.

As another example, some embodiments include a scattered light smoke detector with a detection unit (10) functioning according to the scattered light principle, which comprises:

a first and second LED unit (1F, 1R) for radiating light pulses into a scattered light volume (SV) and a photosensor (2) which is spectrally sensitive thereto, wherein the first LED unit (1F) is arranged with the photosensor (2) at a forward scatter angle ($\alpha$F) and the second LED unit (1R) is arranged with the photosensor (2) at a backward scatter angle ($\alpha$R), wherein the first and second LED unit (1F, 1R) are each configured to output light pulses of a first and second wavelength $\lambda_1$, $\lambda_2$, wherein the second wavelength $\lambda_2$ is greater than the first wavelength $\lambda_1$, and a processor-supported control unit (15) which is connected to the first and second LED unit (1F, 1R) and to the photosensor (2) and which has output means at least for a fire alarm (AL, AL-OF, AL-SB) and an electronic memory store which is loadable with a computer program (PRG), wherein the computer program (PRG) comprises instructions which are executable by the processor-supported control unit (15) for carrying out the method as described above.

As another example, some embodiments include a scattered light smoke detector with a detection unit (10) functioning according to the scattered light principle, which comprises:

an LED unit (1) for radiating light pulses into a scattered light volume (SV) and a photosensor (2F, 2R) which is spectrally sensitive thereto, wherein the first photosensor (2F) is arranged in relation to the LED unit (1) at a forward scatter angle ($\alpha$F) and the second photosensor (2R) is arranged in relation to the LED unit (1) at a backward scatter angle ($\alpha$R), wherein the LED unit (1) is configured to output light pulses of a first and second wavelength $\lambda_1$, $\lambda_2$, wherein the second wavelength $\lambda_2$ is greater than the first wavelength $\lambda_1$, a processor-supported control unit (15) which is connected to the LED unit (1) and to the first and second photosensor (2F, 2R) and which has output means at least for a fire alarm (AL, AL-OF, AL-SB) and an electronic memory store which is loadable with a computer program (PRG), wherein the computer program (PRG) comprises instructions executable by the processor-supported control unit (15) for carrying out the method as described above.

In some embodiments, the respective LED unit (1F, 1R; 1) is configured to output light of the first wavelength $\lambda_1$ in the range of 350 nm to 550 nm and to output light of the second wavelength $\lambda_2$ in the range of 665 nm to 1000 nm, in particular to output light of the first wavelength $\lambda_1$ of 460 nm±40 nm or 390 nm±40 nm and to output light of the second wavelength $\lambda_2$ of 940 nm±40 nm or 860 nm±40 nm.

In some embodiments, the respective LED unit (1F, 1R; 1) is a two-color light-emitting diode for outputting the light of the first and second wavelength $\lambda_1$, $\lambda_2$.

In some embodiments, the respective LED unit (1F, 1R; 1) comprises two adjacently arranged and optically identically oriented single-color light-emitting diodes for outputting the light of the first and second wavelength $\lambda_1$, $\lambda_2$ and/or the respective LED unit (1F, 1R; 1) comprises two single-color light-emitting diodes (1F$\lambda_1$, 1F$\lambda_2$, 1R$\lambda_1$, 1R$\lambda_2$; 1$\lambda_2$) for outputting the light of the first and second wavelength ($\lambda_1$, $\lambda_2$), wherein the two light-emitting diodes (1F$\lambda_1$, 1F$\lambda_2$, 1R$\lambda_1$, 1R$\lambda_2$; 1$\lambda_1$, 1$\lambda_2$) of the respective LED unit (1F, 1R; 1) are configured spatially separated from one another and are oriented toward the common scattered light volume (SV) at an identical scattered light angle ($\alpha$F, $\alpha$R) to the respective photosensor (2; 2R, 2F).

In some embodiments, the control unit (15) is configured to control the respective LED unit (1F, 1R, 1) alternatingly to output the light pulses of the first wavelength $\lambda_1$ and the second wavelength $\lambda_2$.

BRIEF DESCRIPTION OF THE DRAWINGS

The teachings herein and various embodiments thereof are described in greater detail by reference to the accompanying drawings. In the drawings.

DETAILED DESCRIPTION

Figure 1:
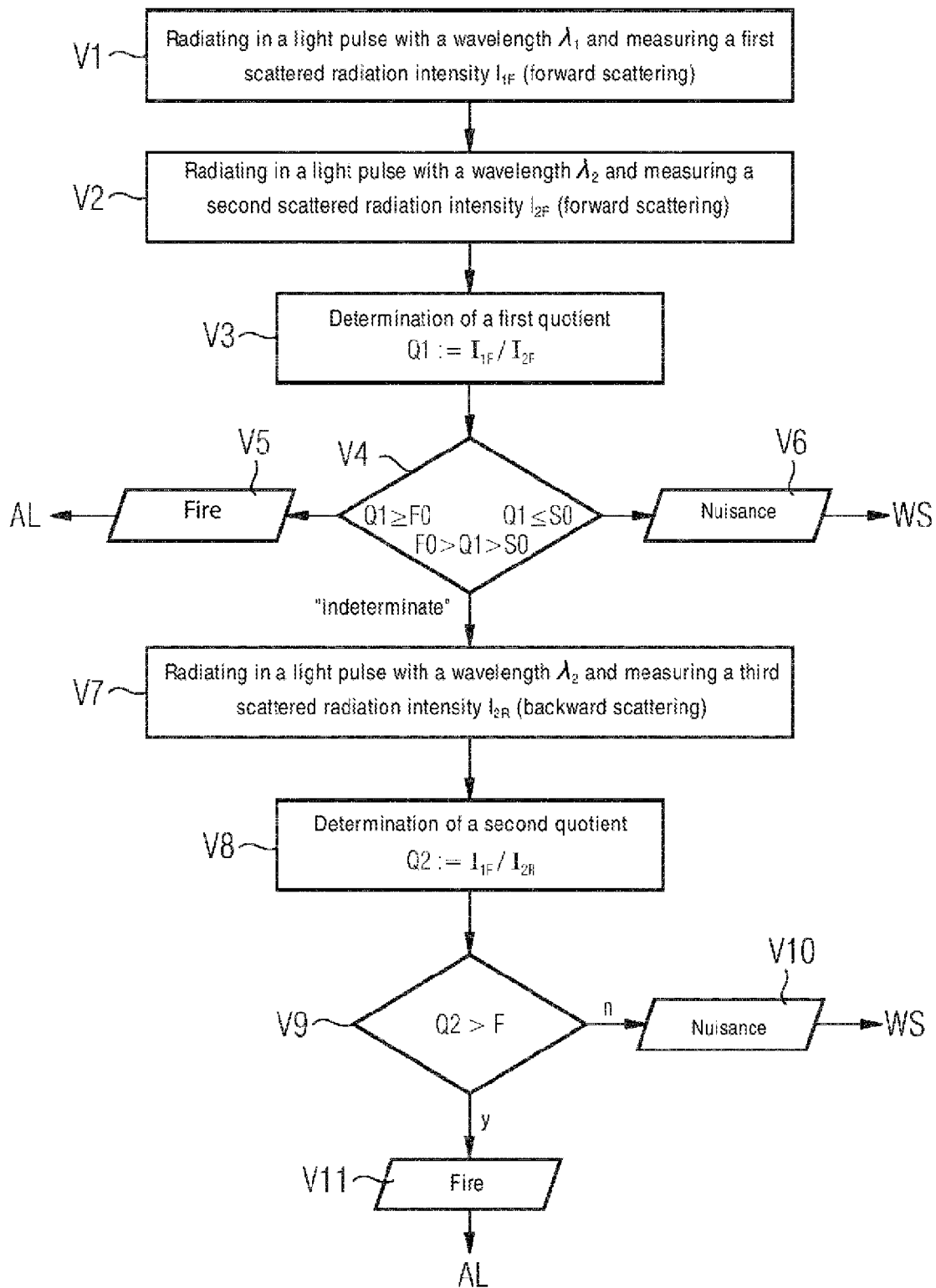
FIG. 1 shows an exemplary flow diagram incorporating teachings of the present disclosure.

The teachings of the present disclosure describe a method for fire detection according to the scattered light principle, comprising the following steps:

a) radiating light pulses of a first wavelength $\lambda_1$ into a scattered light volume and measuring a first scattered radiation intensity $I_{1F}$ generated forward scattering the scattered light volume;

b) radiating light pulses of a second wavelength $\lambda_2$ into the scattered light volume and measuring a first scattered radiation intensity $I_{2F}$ generated by forward scattering in the scattered light volume, the second wavelength $\lambda_2$ being greater than the first wavelength $\lambda_1$, c) determining a first quotient Q1 from the first and second scattered radiation intensity $I_{1F}$, $I_{2F}$ and comparing the first quotient Q1 with a first and second comparison value F0, S0, the first comparison value F0 being greater than the second comparison value S0, and d) if the first quotient Q1 lies between the first and the second comparison value F0, S0:

e) radiating light pulses of the second wavelength $\lambda_2$ into the scattered light volume and measuring a third scattered radiation intensity $I_{2R}$ generated by backward scattering in the scattered light volume, f) determining a second quotient Q2 from the first and third scattered radiation intensity $I_{1F}$, $I_{2R}$ and comparing the second quotient Q2 with a third comparison value F, and g) outputting a fire alarm if the second quotient Q2 exceeds the third comparison value F.

The methods described above include the staggered radiation of light pulses into the scattered light volume. Typically, this only takes place if no clear statements can be made regarding the size and nature of the particles detected, so that neither a definitive fire alarm nor a definitive nuisance message, such as in the case of detected dust or steam, can be output. Therefore, chronologically thereafter, further light pulses of the second wavelength $\lambda_2$ are radiated into the scattered light volume in order to measure a third scattered radiation intensity $I_{2R}$ generated by backward scattering in the scattered light volume as additional "information" for the current evaluation. In some embodiments, if this third scattered radiation intensity $I_{2R}$ is put in proportion to the first scattered light intensity $I_{1F}$, an unambiguous assignment of the previous indeterminate result to a fire alarm or to a nuisance message is now possible. Some embodiments include the appropriate stipulation of the third comparison value F.

In some embodiments, this staggered evaluation thus leads to a particularly reliable fire analysis. Since these "indeterminate" cases arise relatively seldom and that as a consequence relatively seldom do further light pulses have to be radiated in, this method may be particularly energy-saving. In some embodiments, in place of the first and second quotient formation, the respective inverse value can also be determined. In this case, the comparison values F0, S0 and F also have the inverse value. In addition, the relational operators such as less than or greater than also become reversed.

In some embodiments, the method step e) already takes place together with the method step b) and/or the method step f) already takes place together with the method step c). Both the forward scattering and also simultaneously the backward scattering can be measured, effectively, "in reserve". This is the case when the forward scattering and the backward scattering are each acquired with a separate photosensor. The determination of the second quotient Q2 and possibly the comparison with the third comparison value F only takes place if the result of the determination of the first quotient Q1 were to be indeterminate or alternatively, following the measurement of the third scattered radiation intensity $I_{2R}$. In the first case, on average, since the determination of the quotient Q2 is carried out only in case of need, less computing power is required.

In some embodiments, a method comprises the following additional method steps if the first quotient Q1 reaches or exceeds the first comparison value F0:

h) radiating light pulses of the first wavelength $\lambda_1$ into the scattered light volume and measuring a fourth scattered radiation intensity $I_{1R}$ generated by backward scattering in the scattered light volume, i) determining a third quotient Q3 from the fourth and first scattered radiation intensity $I_{1R}$, $I_{1F}$ and comparing the third quotient Q3 with a fourth comparison value OF, and j) outputting a fire alarm for an open fire if the third quotient Q3 exceeds the fourth comparison value, and k) otherwise, outputting a fire alarm for a smoldering fire.

In this event, it is already determined that a fire is unmistakably in progress, since the first quotient Q1 has reached or exceeded the first comparison value F0.

In some embodiments, a differentiation of the detected fire into an open fire or a smoldering fire is now possible. The information thereby obtained can alternatively or additionally also be sent to a general non-specific fire alarm. This additional information regarding the type of the fire may be particularly helpful to the emergency services for location evaluation and for the selection of the firefighting means.

The events SB, OB, WS that have occurred can also be further processed at the detector in order, for example, to control the reaction time of the detector. The detector can start and evaluate a new measurement again in the form of a loop following the first occurrence of a detected smoldering fire SB or open fire OF. Thus, an alarm can be output externally by the detector only when a particular event such as a smoldering fire SB or an open fire OF has occurred, for example, a plurality of times within a predetermined time period of, for example, 10 seconds. In some embodiments, the appropriate stipulation of the fourth comparison value OF determines the effectiveness.

In some embodiments, method step h) already takes place together with the method step a) and/or method step i) already takes place together with the preceding method step c). In some embodiments, the measurement of the fourth scattered radiation intensity $I_{1R}$ may take place effectively "in reserve". The determination of the third quotient Q3 and possibly the comparison with the fourth comparison value OF only takes place if a differentiation of the fire into "open fire" or "smoldering fire" is desired or demanded, or alternatively following the measurement of the fourth scattered radiation intensity $I_{1R}$. In the first case, on average, since the determination of the quotient Q3 is carried out only in case of need, less computing power is required.

In some embodiments, in place of the third quotient Q3, a fourth quotient Q4 is determined from the fourth and second scattered radiation intensity $I_{1R}$, $I_{2F}$ and this can be compared with a fifth comparison value OF'. In some embodiments, a differentiation of the detected fire into an open fire or a smoldering fire is possible based on the appropriate stipulation of the fifth comparison value OF'.

In some embodiments, the radiating-in of the light pulses of the second wavelength $\lambda_2$ and the measurement of the second and third scattered radiation intensity $I_{2F}$, $I_{2R}$ takes place only when the first scattered radiation intensity $I_{1F}$ exceeds or has exceeded a minimum scattered light level MIN for the smoke detection.

In some embodiments, light pulses of the second wavelength $\lambda_2$ can also be repeatedly radiated, in particular cyclically, into the scattered light volume. If the measured second scattered radiation intensity $I_{2F}$ then reaches or exceeds a minimum scattered light level MIN for the smoke detection, light pulses of the first wavelength $\lambda_1$ are then radiated into the scattered light volume and the first scattered radiation intensity $I_{1F}$ and, where relevant, the fourth scattered radiation intensity $I_{1R}$ are measured.

In some embodiments, the light pulses of the first wavelength $\lambda_1$ are repeatedly radiated, in particular cyclically, into the scattered light volume, for example, with a repetition frequency in the range of 0.1 to 5 Hz. Considered as an average over time, the measured first scattered radiation intensity $I_{1F}$ only seldom reaches the minimum scattered light level MIN. Only a sufficient concentration of smoke particles, dust or steam enters the scattered light volume is the minimum scattered light level MIN exceeded.

In some embodiments, the use of the "blue" first wavelength $\lambda_1$ is scattered both at small smoke particles as well as at large smoke particles such as dust or steam. By contrast, "red" light of the second wavelength $\lambda_2$ is scattered only slightly at the small smoke particles. As a result, a complete monitoring both of smoke particles and also of nuisance may be ensured. Likewise, through the staggered switching in of the light radiation of the second wavelength $\lambda_2$, the current consumption is drastically reduced.

In some embodiments, the radiating-in of the light pulses of the first and second wavelength $\lambda_1$, $\lambda_2$ into the scattered light volume takes place at a higher repetition frequency if the first scattered radiation intensity $I_{1F}$ exceeds or has exceeded a minimum scattered light level MIN for the smoke detection. The repetition frequency can be increased, for example, by the factor 2, 4, 5, or 8. As a result, a more reliable detection of a possible fire or of a nuisance is possible, as, for example, due to a resultant greater signal-to-noise ratio or due to a resultant better synchronization of the light pulses.

In some embodiments, the first and second quotient Q1, Q2 are calibrated to an identical ratio value, e.g., to a value of 2 for scattering particles with a mean diameter in the range of 0.5 to 1.5 μm. In some embodiments, the third or fourth quotient Q3, Q4 is calibrated to half of this equal ratio value, e.g. to a value of 1.

The calibration typically takes place with an aerosol which flows through the scattered light volume. During a calibration process, scattering particles with a mean diameter in the range of 0.5 to 1.5 μm can then be introduced with a pre-determined particle concentration into the scattering volume. The scattering particles can alternatively be dusts, for example, cement dust. Given the existence of stable conditions, for each scattered radiation intensity $I_{1F}$, $I_{2F}$, $I_{1R}$, $I_{2R}$, a reference value $I_{1F}$, $I_{2F}$, $I_{1R}$, $I_{2R}$, is measured.

If then the first quotient $Q1=I_{1F}/I_{2F}$ has a ratio value of 2, then this is to be multiplied by a compensating constant which results from this ratio value multiplied by the quotient from the currently measured reference values $I_{2F}/I_{1F}$. A similar principle applies for the second, third, and fourth quotients Q2, Q3, Q4. In some embodiments, the light pulse duration or the LED current can be adjusted until the desired ratio Q1-Q4 is reached.

In some embodiments, if the first quotient Q1 is calibrated to the ratio value of 2 at a mean particle size of, for example, 0.55 μm in the smoke channel, then a first comparison value F0 exists for the particularly reliable existence of fire at a value of 2 and a second comparison value S0 for the particularly reliable existence or nuisance at a value or 0.9. If the second quotient Q2 is likewise calibrated to a ratio value of 2 at a mean particle size of, for example, 0.55 μm in the smoke channel, then a third comparison value F exists for the reliable existence of fire at a value of 1.

If the third quotient Q3 is calibrated to a ratio value of 1 at a mean particle size of, for example, 0.55 μm in the smoke channel, then a fourth comparison value OF exists for the particularly reliable existence of open fire at a value of 1.5. If, finally, the fourth quotient Q4 is calibrated to a ratio value of 1 at a mean particle size of, for example, 0.55 μm in the smoke channel, then a fifth comparison value OF' exists for the particularly reliable existence of open fire at a value of 4.

In some embodiments, a (first) scattered light smoke detector with a detection unit functions according to the scattered light principle. The scattered light smoke detector comprises a first and second LED unit for radiating-in light pulses in a scattered light volume and a (common) photosensor spectrally sensitive thereto. The first LED unit is arranged with a photosensor at a forward scatter angle and the second LED unit is arranged with the photosensor at a backward scatter angle.

In some embodiments, the first and second LED units are each configured to output light pulses of a first, and second wavelength $\lambda_1$, $\lambda_2$, the second wavelength $\lambda_2$ being greater than the first wavelength $\lambda_1$. Furthermore, the scattered light smoke detector comprises a processor-supported control unit which is connected to the first and second LED unit and the photosensor. In addition, the control unit comprises output means at least for a fire alarm and an electronic memory store loadable with a computer program. In some embodiments, the computer program comprises instructions executable by the processor-supported control unit for carrying out the inventive method.

In some embodiments, the photosensor comprises a semiconductor diode, in particular a silicon PIN photodiode, e.g., a silicon PIN photodiode with improved blue sensitivity.

In some embodiments, the computer program may be loaded into a non-volatile electronic memory store of the microcontroller, for example, in a Flash memory store. The microcontroller typically has a series of integrated hardware function units, for example, analogue-digital converters, digital-analogue converters, timers, digital input/output units and bus interfaces, inter alia as output means for a fire alarm or a nuisance message.

In some embodiments, two LED units and one common photosensor are present.

In some embodiments, the processor-supported control unit is configured for individually controlling the two LED units, for measuring a first and second scattered radiation intensity $I_{1F}$, $I_{2F}$ generated by forward scattering of the first and second wavelength $\lambda_1$, $\lambda_2$ and for measuring a third scattered radiation intensity $I_{2R}$ generated by backward scattering of the second wavelength $\lambda_2$, in each case by means of the photosensor.

In some embodiments, the control unit is configured
  to determine the first quotient Q1 from the first and second scattered radiation intensity $I_{1F}$, $I_{2F}$ and to compare it with the first and second comparison value F0, S0,
  to control the second LED unit to output light pulses and to measure the third scattered radiation intensity $I_{2R}$ if the first quotient Q1 lies between the first and the second comparison value F0, S0,
  to determine a second quotient Q2 from the first and third scattered radiation intensity $I_{1F}$, $I_{2R}$ and to compare this quotient Q2 with a third comparison value F, and
  to output the fire alarm if the second quotient Q2 exceeds the third comparison value F.

Otherwise, if the second quotient Q2 does not exceed the third comparison value F, the control unit can be configured to output a nuisance message, for example, a dust or steam warning. In some embodiments, the control unit can be configured to start a new measurement and to ignore this event. After all, it is specifically the particularly reliable determination of the presence of a nuisance such as dust or steam which prevents the output of an otherwise possible false alarm.

The second LED unit can also be additionally configured to output light pulses of the first wavelength $\lambda_1$.

In some embodiments, the control unit can then be configured
  to control the second LED unit to output light pulses of the first wavelength $\lambda_1$ and to measure a fourth scattered radiation intensity $I_{1R}$ generated by backward scattering of the first wavelength $\lambda_1$ if the first quotient Q1 reaches or exceeds the first comparison value F0,
  to determine a third quotient Q3 from the fourth and first scattered radiation intensity $I_{1R}$, $I_{1F}$ and to compare this quotient Q3 with a fourth comparison value OF, and
  to output a fire alarm, in particular a fire alarm for open fire if the third quotient Q3 exceeds the fourth comparison value, or otherwise to output a fire alarm for smoldering fire.

In some embodiments, the forward scatter angle lies in the range of 20° to 90°, and/or 30° to 70°. The backward scatter angle lies in the range of more than 90° to 160°, and/or from 110° to 150°. In some embodiments, values for the forward and backward scatter angle are 60° and 120°.

In some embodiments, each LED unit is configured to output light of the first wavelength $\lambda_1$ in the range of 350 nm to 550 nm and to output light of the second wavelength $\lambda_2$ in the range of 665 nm to 1000 nm. It is configured, in particular, to output light of the first wavelength $\lambda_1$ of 460 nm±40 nm or 390 nm±40 nm and to output light of the second wavelength $\lambda_2$ of 940 nm±40 nm or 860 nm±40 nm, and/or to output monochromatic light.

Figure 5:
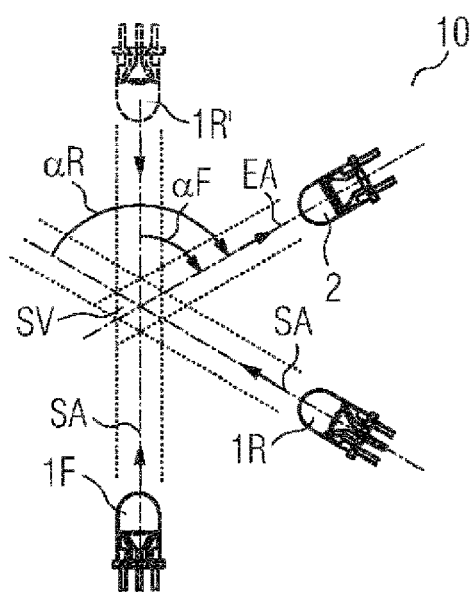
FIG. 5 shows an exemplary first embodiment of a detection unit functioning according to the scattered light principle for a smoke detector with two LED units and a photoreceiver incorporating teachings of the present disclosure.
Figure 6:
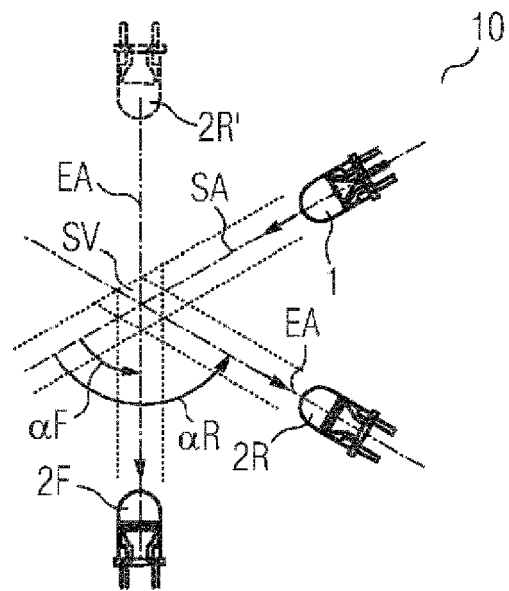
FIG. 6 shows a second embodiment of a detection unit for a smoke detector with one LED unit and two photoreceivers incorporating teachings of the present disclosure.

In some embodiments, a (second) scattered light smoke detector includes a detection unit functioning according to the scattered light principle. The scattered light arrangement of the second scattered light smoke detector includes, as compared with the first scattered light smoke detector, on an alternative dual scattered light arrangement. As FIGS. 5 and 6 show, in principle, two dual scattered light arrangements exist for carrying out the inventive method. In the first case according to FIG. 5, two LED units are directed to a common scattered light volume, but in relation to a single photosensor, at a forward and backward scatter angle. In the second case according to FIG. 6, a single LED unit is directed to the scattered light volume, whereby here two photosensors are arranged in relation to the LED unit at a forward and backward scatter angle to the LED unit. The result of the scattered light detection is the same in principle for both arrangements.

In some embodiments, the (second) scattered light smoke detector comprises a (single) LED unit for radiating light pulses into a scattered light volume, and a first and second photosensor spectrally sensitive thereto. The first photosensor is arranged in relation to the LED unit at a forward scatter angle and the second photosensor arranged in relation to the LED unit at a backward scatter angle. The first LED unit is configured to output light pulses of a first and second wavelength $\lambda_1$, $\lambda_2$, the second wavelength $\lambda_2$ again being greater than the first wavelength $\lambda_1$. In some embodiments, the scattered light smoke detector comprises a processor-supported control unit which is connected to the LED unit and to the first and second photosensor. In addition, the control unit comprises output means at least for a fire alarm and an electronic memory store which is loadable with a computer program. In some embodiments, the computer program comprises instructions executable by the processor-supported control unit for carrying out the inventive method.

In some embodiments, therefore, just one common LED unit and two photosensors are present. In this case, the processor-supported control unit is configured for controlling the (single) LED unit for measuring a first and second scattered radiation intensity $I_{2F}$ output by the first photosensor of the first and second wavelength $\lambda_1$, $\lambda_2$ and for measuring a third scattered radiation intensity $I_{2R}$ output by the second photosensor of the second wavelength $\lambda_2$.

The control unit is thus configured
to determine from the first and second scattered radiation intensity $I_{1F}$, $I_{2F}$ a first quotient Q1 and to compare it with the first and second comparison value F0, S0,
to determine a second quotient Q2 from the first and third scattered radiation intensity $I_{1F}$, $I_{2R}$ if the first quotient Q1 lies between the first and the second comparison value F0, S0,
to compare the second quotient Q2 with a third comparison value F, and
to output the fire alarm if the second quotient Q2 exceeds the third comparison value F.

In some embodiments, the control unit can be configured to output a nuisance message, for example, a dust or steam warning. In some embodiments, the control unit can be configured to start a new measurement and to ignore this event.

Furthermore, the control unit can also be configured
to measure a fourth scattered radiation intensity $I_{1R}$ output by the second photosensor of the first wavelength $\lambda_1$ and to determine a third quotient Q3 from the fourth and first scattered radiation intensity $I_{1R}$, $I_{1F}$ if the first quotient 0.1 reaches or exceeds the first comparison value F0,
to compare the third quotient Q3 with a fourth comparison value OF, and
to output a fire alarm, in particular a fire alarm for open fire if the third quotient Q3 exceeds the fourth comparison value, or otherwise to output a fire alarm for smoldering fire.

In some embodiments, the respective LED unit is a two-color light-emitting diode to output the light of the first and second wavelength $\lambda_1$, $\lambda_2$. Such a two-color LED is known, for example, from EP 2 908 298 A1, from DE 20 2014 009 739 U1 or from DE 20 2015 000 820 U1. The two-color light-emitting diode may be an integral or single-part optoelectronic element, in other words, therefore, a modular unit. In some embodiments, such a two-color light-emitting diode is a light-emitting diode with a transparent (standard) housing having a diameter of 3 mm or 5 mm. Such 3 mm or 5 mm light-emitting diodes are sold, as is well known, "off the shelf" as a mass consumer product. In some embodiments, it comprises an SMD component for surface mounting.

A two-color light-emitting diode as an LED unit is that, in comparison with the detection unit according to EP 1 408 469 A2, in place of four (single-part) optoelectronic components, only three (single-part) optoelectronic components are required. In addition to saving one component, the remaining error may be reduced following a calibration of the optical path in the detection unit. Typically, during assembly of two separate light-emitting diodes, there result relatively large deviations in the orientation and placement relative to one another than with a two-color light-emitting diode.

In some embodiments, through the now possible omission of the fourth component, an optically scattering nuisance is omitted. In place of the otherwise fourth component, further light-absorbing or light-deflecting components can be used as light traps in the detection unit. By this means, the measurement technology-disrupting basic impulse is significantly reduced.

In some embodiments, the respective LED unit can also comprise two adjacently arranged and optically identically oriented single-color light-emitting diodes to output the light of the first and second wavelength $\lambda_1$, $\lambda_2$. In this case, the optical transmitting axes of the two single-color LEDs extend in such a manner that they intersect in the scattered light center.

In some embodiments, the respective LED unit can comprise two single-color light-emitting diodes to output the light of the first and second wavelength $\lambda_1$, $\lambda_2$, whereby although the two light-emitting diodes of the respective LED unit are spatially separated from one another, they are oriented toward the common scattered light volume at an identical scattered light angle to the respective photosensor. The scattered light of the two light-emitting diodes is thus incident upon the common photosensor at an identical angle.

In some embodiments, the control unit is configured to control the respective LED unit alternatingly to output the light pulses of the first wavelength $\lambda_1$ and the second wavelength $\lambda_2$. The acquisition by measuring to of the associated scattered light from the scattered light volume by means of the photosensor then takes place synchronized. Such scattered light smoke detectors may have a detector housing width at least one smoke entry opening and a detection unit for the smoke detection which is accommodated in the detector housing. In some embodiments, the detection unit comprises an optical measuring chamber which is shielded against ambient light but is permeable to the smoke to be detected. The latter may comprise a plurality of lamellae shielding the ambient light and is therefore also designated a labyrinth. The optical detection unit comprises the previously described respective LED unit and the respective photosensor in the forward and backward scattered light arrangement.

In some embodiments, the scattered light smoke detector can be a so-called open scattered light smoke detector. In this case, the scattered light smoke detector has no labyrinth. Rather, the respective LED unit and the respective photosensor are arranged in the detector housing. They are also arranged in a forward and backward scattered light arrangement with a scattered light volume lying outside the detector housing and thus outside the whole scattered light smoke detector.

FIG. 1 shows an exemplary flow diagram of one example method incorporating the teachings of the present disclosure. The individual steps V1-V11 may be executed by suitable program steps of a computer program and are carried out on a processor-supported control unit of a scattered light smoke detector, for example, on a microcontroller.

In step V1, a light pulse of a first wavelength $\lambda_1$, for example a blue light pulse, is radiated into a scattered light volume and a first scattered radiation intensity $I_{1F}$ generated by forward scattering in the scattered light volume SV is measured. In step V2, a light pulse of a second wavelength $\lambda_2$, for example an infrared light pulse, is radiated into the scattered light volume and a second scattered radiation intensity $I_{2F}$ generated by forward scattering in the scattered light volume SV is measured. The two steps V1, V2 can also take place in the reverse order. In the subsequent step V3, a first quotient Q1 is determined from the first and second scattered radiation intensity $I_{1F}$, $I_{2F}$. Thereafter in step V4, the first quotient Q1 is compared with a first comparison value F0 and with a second comparison value S0. The first comparison value F0 is quantitatively greater than the second comparison value S0. If the first quotient Q1 reaches or exceeds the first comparison value F0, then in step V5, a fire alarm AL is output. If the first quotient Q1 is equal to or smaller than the second comparison value S0, then in step V6, a nuisance message WS is output. This is the case, for example, if dust or steam has been detected. Otherwise, the first quotient Q1 lies between the two comparison values F0 and S0 and is classified as indeterminate. What is meant by "indeterminate" is that no reliable statement can be made concerning whether a fire, i.e. smoke particles or merely dust particles or steam are present.

In an indeterminate case, therefore in step V7, a light pulse of a second wavelength $\lambda_2$ is radiated into the scattered light volume and a third scattered radiation intensity $I_{2R}$ generated by backward scattering in the scattered light volume is measured. Subsequently, in step V8, a second quotient Q2 is determined from the first and third scattered radiation intensity $I_{1F}$, $I_{2R}$. Thereafter in step V9, this quotient Q2 is compared with a third comparison value F. If the second quotient Q2 exceed the third comparison value F, then in step V11, a fire alarm AL is output. Otherwise, in step V10, a nuisance message WS is output.

Figure 2:
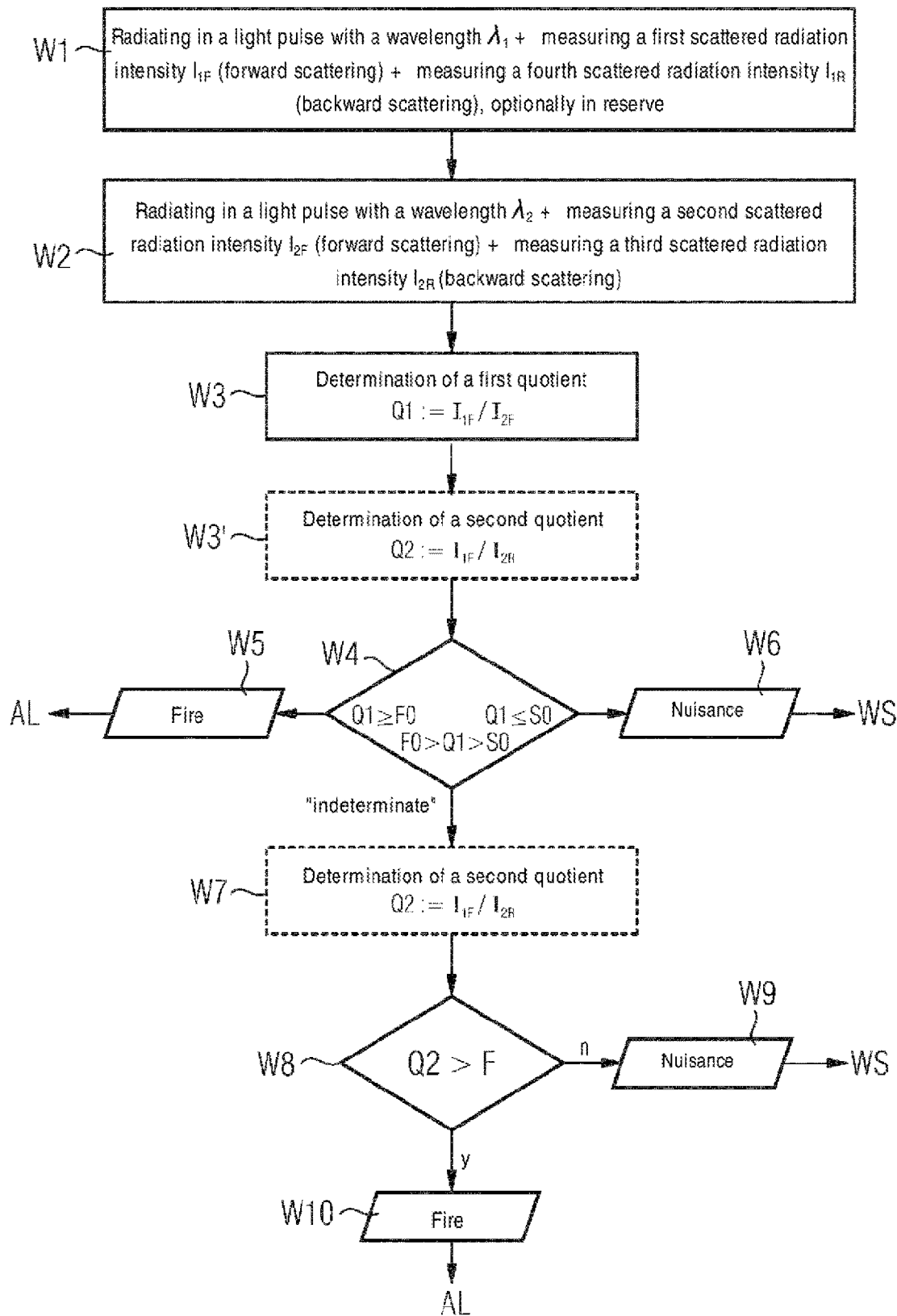
FIG. 2 shows an exemplary flow diagram incorporating teachings of the present disclosure.

FIG. 2 shows an exemplary flow diagram depicted a second method incorporating the teachings of the present disclosure. The individual steps W1-W10 may be suitable program steps of a computer program carried out on a processor-supported control unit of a scattered light smoke detector, for example, on a microcontroller.

In comparison with the preceding method variant, in the two first steps W1, W2, light pulses of the first and second wavelength $\lambda_1$, $\lambda_2$ are radiated into the scattered light volume. In addition to the first and second scattered radiation intensity $I_{1F}$, $I_{2F}$ the third scattered radiation intensity $I_{2R}$ is also already measured—effectively in reserve—and further preferably also the fourth scattered radiation intensity from the backward scattering is measured. A further radiating-in of the light pulses of the first and second wavelength $\lambda_1$, $\lambda_2$ possibly required later and the measurement of the third and fourth scattered radiation intensity $I_{1R}$, $I_{2R}$ is then unnecessary.

In the subsequent step W3, the first quotient Q1 determined from the first and second scattered radiation intensity $I_{1F}$, $I_{2F}$ and simultaneously in step W3', or alternatively later in step W7, the second quotient Q2 is determined. The subsequent steps W4-W10 again correspond to the steps V8-V11 of the previous method variant.

Figure 3:
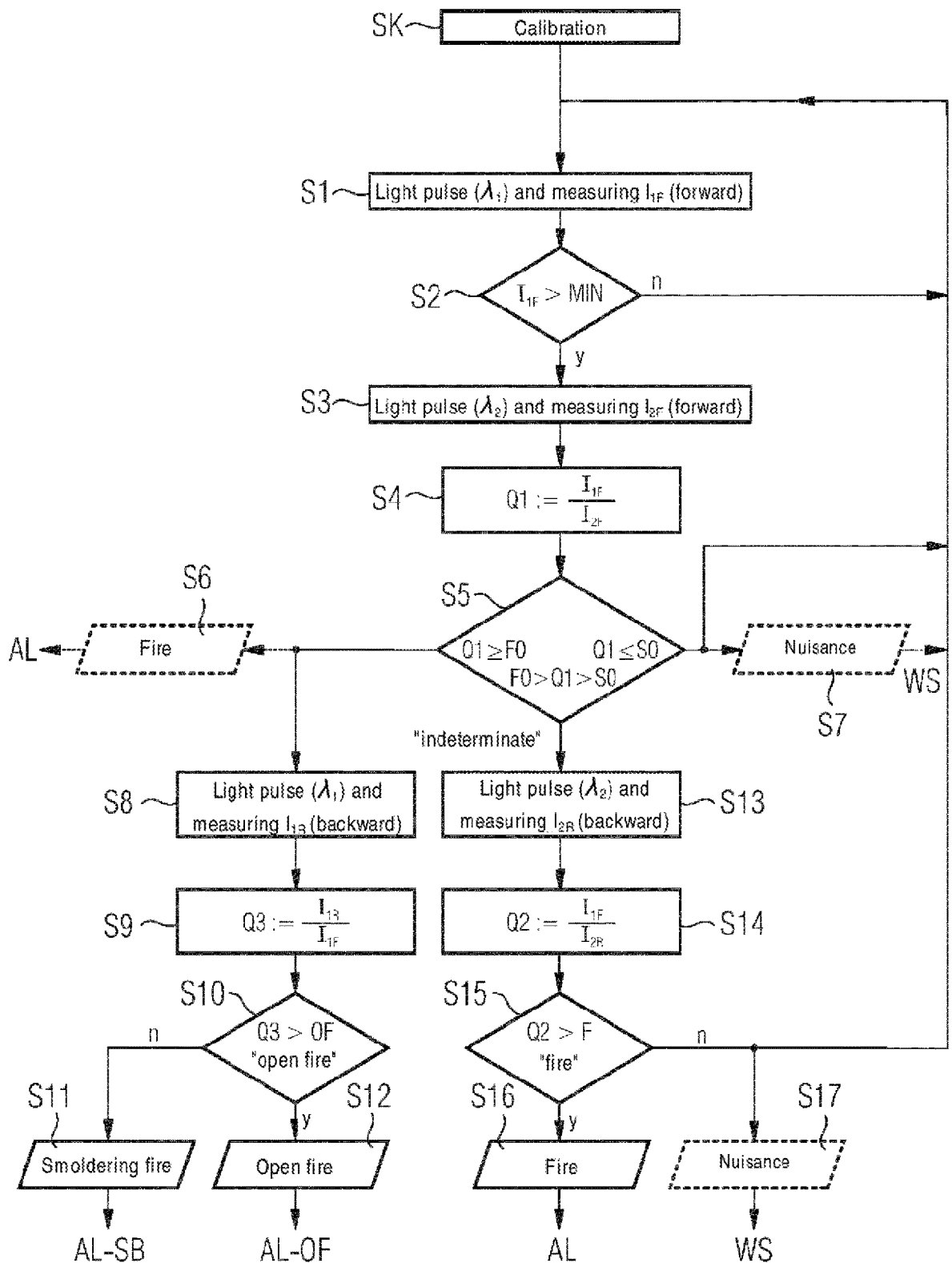
FIG. 3 shows an exemplary flow diagram incorporating teachings of the present disclosure.

FIG. 3 shows an exemplary flow diagram depicting a third method variant incorporating teachings of the present disclosure. The individual steps SK, S1-S17 may be suitable program steps of a computer program carried out on a processor-supported control unit of a scattered light smoke detector, for example, on a microcontroller.

In the step SK, a (one-time) calibration of the scattered radiation intensities $I_{1F}$, $I_{2F}$, $I_{1R}$, $I_{2R}$ takes place, for example, with scattering particles such as an aerosol with a pre-determined mean diameter in the range of 0.5 to 1.5 μm, which flows through the scattered light volume. In some embodiments, the quotients Q1 and Q2 are calibrated to a ratio value of 2 and the quotients Q3 or Q are calibrated to a ratio value of 1.

In step S1, a light pulse of the first wavelength $\lambda_1$, for example a blue light pulse, is radiated into a scattered light volume and a first scattered radiation intensity generated by forward scattering in the scattered light volume is measured. In step S2, a comparison is made of whether the level of the measured first scattered radiation intensity $I_{1F}$ exceeds a minimum level MIN for the smoke detection. If this not so—which is largely the case—then a branch back again to step S1 for a new measurement takes place.

Otherwise, in step S3, a Light pulse of a second wavelength $\lambda_2$, for example an infrared light pulse, is radiated into the scattered light volume and a second scattered radiation intensity $I_{2F}$ generated by forward scattering in the scattered light volume is measured.

In the subsequent step S4, a first quotient Q1 is determined from the first and second scattered radiation intensity $I_{1F}$, $I_{2F}$. Thereafter in step S5, the first quotient Q1 is compared with a first and second comparison value F0, S0. The first comparison value F0 is quantitatively greater than the second comparison value S0.

If the first quotient Q1 reaches or exceeds the first comparison value F0, then in step S6, a fire alarm AL is output.

In some embodiments, in step S8—as shown in the example of FIG. 3—a light pulse of the first wavelength $\lambda_1$ is radiated into the scattered light volume and a fourth scattered radiation intensity $I_{1R}$ generated by backward scattering in the scattered light volume is measured. In the subsequent step S9, a third quotient Q3 is determined from the fourth and first scattered radiation intensity $I_{1R}$, $I_{1F}$. Subsequently in step S10, the third quotient Q3 is compared with a fourth comparison value OF for open fire. If the third quotient Q3 exceeds the fourth comparison value OF, then in step S12, a fire alarm AL-OF for open fire is output and otherwise in step S11, a fire alarm AL-SB for smoldering fire is output.

If the first quotient Q1 is equal to or smaller than the second comparison value S0, then in step S7, a nuisance message WS is output. This is the case, for example, if dust or steam has been detected. In some embodiments, branching back again to step S1 for a new measurement takes place.

Otherwise, the first quotient Q1 lies between the two comparison values F0 and S0 and is therefore classified as indeterminate. Then, in step S13, a light pulse of the second wavelength $\lambda_2$ is radiated into the scattered light volume and a third scattered radiation intensity $I_{2R}$ generated by backward scattering is measured in order effectively to provide "clarity" in relation to the detected indeterminate event.

Subsequently, in step S14, a second quotient Q2 is determined from the first and third scattered radiation intensity $I_{1F}$, $I_{2R}$ and this is subsequently compared in step S15 with a third comparison value F for fire. If now the second quotient Q2 exceeds the third comparison value F, then in step S16, a fire alarm AL is output. Otherwise, in step S17, a nuisance message WS is output. In some embodiments, branching back to step S1 for a new measurement takes place and this current event is more or less ignored.

In some embodiments, in place of an individual light pulse of the wavelength $\lambda_1$, $\lambda_2$, a plurality of light pulses is radiated into the scattered light volume and accordingly a plurality of values is measured for the respective scattered radiation intensity $I_{1F}$, $I_{2F}I_{1R}$, $I_{2R}$ in order to form a mean value therefrom in each case.

In some embodiments, the staggered switching in of the radiating-in of the light pulses takes place briefly and successively until the last valid clarification of the detected event, i.e. whether a general fire alarm AL, an open fire AL-OF, a smoldering fire AL-SB or a nuisance WS has been detected. The determination of the detected event takes place with regard to the repetition frequency of the fire detection, effectively at the same time and thus simultaneous. Preferably, this repetition frequency is further increased if the first scattered radiation intensity $I_{1F}$ exceeds a minimum scattered light level MIN for smoke detection.

Figure 4:
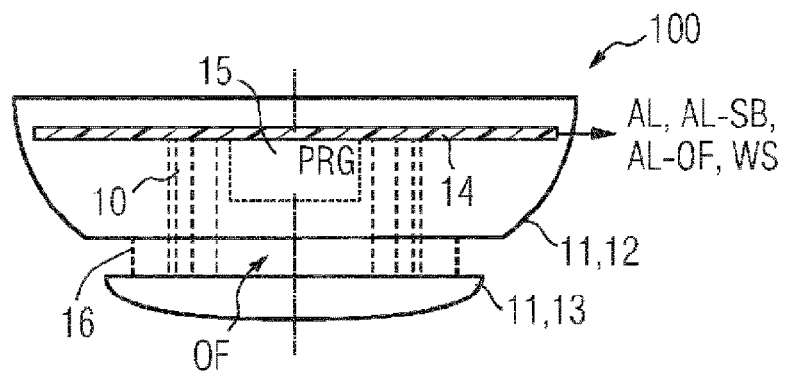
FIG. 4 shows an example of a scattered light smoke detector with a control unit having a computer program for carrying out methods incorporating teachings of the present disclosure.

FIG. 4 is an example of a scattered light smoke detector 100 with a control unit 15 having a computer program PRG for carrying out the methods described herein. The scattered light smoke detector 100 shown has housing 11 with a base body 12 and a detector hood 13.

Arranged therebetween are smoke entry openings OF for the possible passage of smoke particles that are to be detected into an internal optical measuring chamber 10. The optical measuring chamber 10 comprises as the optical detection unit a plurality of light-screening, lamellae. These serve, in particular, to screen against direct ambient light, but they are permeable to smoke that is to be detected. The optical detection unit 10 hereby comprises a scattered light arrangement of at least one LED unit and at least one photosensor. A circuit support on which, inter alia, the processor-supported control unit 15 in the form of a microcontroller is mounted is identified with the reference character 14. Finally, an insect protection is identified with the reference character 16.

FIG. 5 shows an exemplary embodiment of a detection unit 10 functioning according to the scattered light principle for a scattered light smoke detector 100 with two LED units 1F, 1R and a (single) photoreceiver 2 incorporating the teachings herein.

In the present example, the first LED unit 1F is arranged at a forward scattering angle $\alpha F$ of 60° to the photosensor 2. The second LED unit 1R is arranged at a backward scattering angle $\alpha R$ of 120° to the same photosensor 2. At least the first LED unit 1F, preferably both LED units 1F, 1R are two-color light-emitting diodes to output light of the first and second wavelength $\lambda_1$, $\lambda_2$, e.g. to output light in the range of 350 nm to 550 nm and to output light in the range of 665 nm to 1000 nm.

In some embodiments, the two scattering angles $\alpha F$, $\alpha R$ are defined the intersection of the respective transmitting axis SA and the receiving axis EA of the common photosensor 2. The intersection point is hereby in the center of the common scattered light volume SV as the intersection volume between the output light beams of the LED units 1F, 1R and the optical acquisition region of the photosensor 2. The two transmitting axes SA and the receiving axis EA do not necessarily hereby lie in a common plane.

1R' is an alternative position in a dashed representation for the second LED unit 1R, also at a backward scattering angle $\alpha R$ of 120°. However, this arrangement is less favorable from a measuring technology standpoint, since an opposing LED unit 1F, 1R' acts for the other like an optical scattering body. This is the case, in particular, if all the axes SA, EA lie in a common plane.

All three components 1F, 1R, 2 may be electrically connected to a circuit support 14 which is usually situated outside the detection unit 10 and adjoins it. Further components, for example, a microcontroller, active or passive components can be arranged on the circuit support.

FIG. 6 shows a second embodiment of a detection unit 10 with a (single) LED unit 1 and two photoreceivers 2F, 2R incorporating the teachings herein. In the dual arrangement which is shown here by comparison with the previous arrangement and which, in principle, has the same function, a first photosensor 2F is arranged at a forward scatter angle $\alpha F$ of 60° to the LED unit 1. The second photosensor 2R is arranged at a backward scatter angle $\alpha R$ of 120° to the same LED unit 1. In some embodiments, the two scattering angles $\alpha F$, $\alpha R$ are defined by the intersection of the respective receiving axes EA and the transmitting axis SA of the common LED unit 1.

2R' is an alternative position in a dashed representation for the second photosensor 2R, also at a backward scattering angle $\alpha R$ of 120°.

Figure 7:
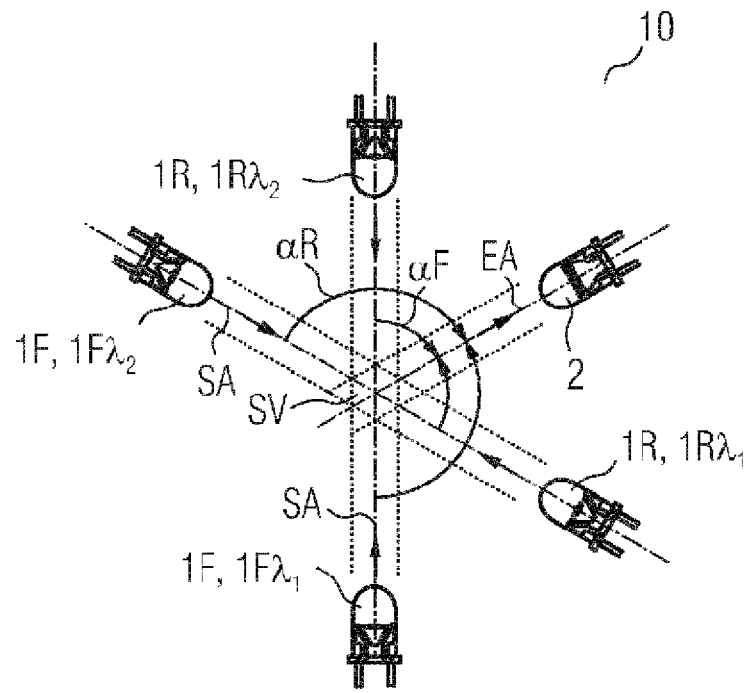
FIG. 7 shows an alternative embodiment of the detection unit, by way of example, according FIG. 5.

FIG. 7 shows an alternative embodiment of the detection unit 10, for example, according to FIG. 5 with two single-color light-emitting diodes $1F\lambda_1$, $1F\lambda_2$; $1R\lambda_1$, $1R\lambda_2$ of a respective LED unit 1F, 1R, arranged spatially distributed in each case. In this arrangement, the two LED units 1F, 1R are not each realized as an optoelectronic component in the form of a two-color LED, but rather are distributed in each case into two single-color light-emitting diodes $1F\lambda_1$, $1F\lambda_2$; $1R\lambda_1$, $1R\lambda_2$, but again in each case at the same scattering angle $\alpha F$, $\alpha R$.

Figure 8:
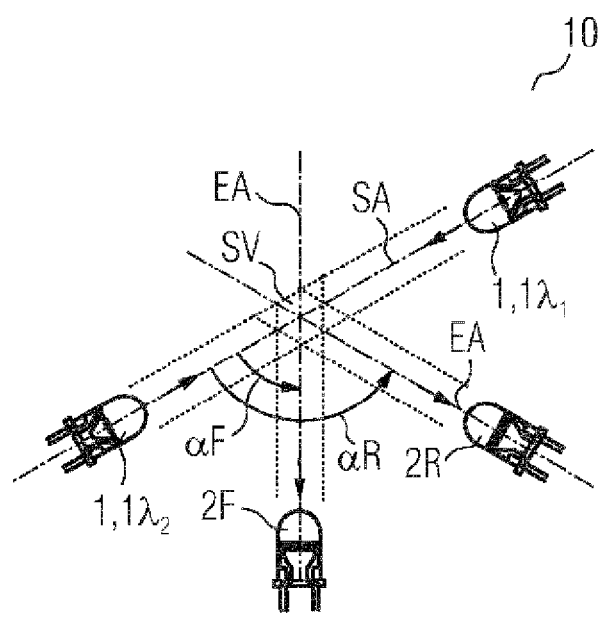
FIG. 8 shows an alternative embodiment of the detection unit, way of example according to FIG. 6.

FIG. 8 shows an alternative embodiment of the detection unit, for example, according to FIG. 6 with two single-color light-emitting diodes $1\lambda_1$, $1\lambda_2$ of the LED unit 1, arranged spatially distributed. In this arrangement, the LED unit 1 is not realized as an optoelectronic component in the form of a two-color LED, but rather is distributed into two single-color light-emitting diodes $1\lambda_1$, $1F\lambda_2$, but again in each case at the same scattering angle $\alpha F$, $\alpha R$.

LIST OF REFERENCE CHARACTERS 1, 1F, 1R, LED unit, two-color LED, light-emitting diode
1R' Equivalent position arrangement
$1F\lambda_1$, $1F\lambda_2$, Single-color light-emitting diode of an LED unit
$1R\lambda_1$, $1R\lambda_2$;
$1\lambda_1$, $1\lambda_2$
2, 2F, 2R, Photosensor, photodiode, silicon PIN diode
2R' Equivalent position arrangement
10 Detection unit, measuring chamber
11 Detector housing
12 Base body
13 Detector hood
14 Circuit board, circuit carrier
15 Control unit, microcontroller, microcomputer
16 Insect protection, grid
100 Smoke detector, fire detector, scattered light smoke detector
AL Alarm signal, fire alarm, combustion alarm
AL-SB Fire alarm for smoldering, fire
AL-OF Fire alarm for open fire
EA Receiving axis, optical axis, main optical axis of the photosensor
OF Smoke entry aperture
PRG Computer program
SA Transmitting axis, optical axis, optical main axis of the LED unit
SV Scattered light volume, scattering center, measuring volume
WS Nuisance message, dust/steam message
SK, S1-S17, Method steps
V1-V1,
W1-W10, W3'
$\alpha F$ Scattering angle, forward scatter angle
$\alpha R$ Scattering angle, backward scatter angle

What is claimed is:

1. A method for fire detection the method comprising:
    radiating light pulses of a first wavelength $\lambda_1$ into a scattered light volume and measuring a first scattered radiation intensity generated by forward scattering in the scattered light volume;
    radiating light pulses of a second wavelength $\lambda_2$ into the scattered light volume and measuring a second scattered radiation intensity generated by forward scattering in the scattered light volume, wherein the second wavelength $\lambda_2$ is greater than the first wavelength $\lambda_1$;
    determining a first quotient from the first and second scattered radiation intensity and comparing the first quotient with a first and second comparison value, wherein the first comparison value is greater than the second comparison value; and
    if the first quotient between the first and the second comparison value:
        measuring a third scattered radiation intensity generated by backward scattering of the second wavelength in the scattered light volume;
        determining a second quotient from the first and third scattered radiation intensity and comparing the second quotient with a third comparison value; and
        generating a fire alarm if the second quotient exceeds the third comparison value.

2. The method as claimed in claim 1, wherein both the third scattered radiation intensity and the second scattered radiation intensity are measured from the same light pulses of the second wavelength.

3. The method as claimed in claim 1, further comprising, if the first quotient Q1 reaches or exceeds the first comparison value F0:
    measuring a fourth scattered radiation intensity generated by backward scattering of the first wavelength in the scattered light volume;
    determining a third quotient from the fourth and first scattered radiation intensity and comparing the third quotient with a fourth comparison value;
    generating a fire alarm for an open fire if the third quotient exceeds the fourth comparison value;
    otherwise, generating a fire alarm for a smoldering fire.

4. The method as claimed in claim 3, wherein the fourth scattered radiation intensity and the first scattered radiation intensity are measured from the same light pulses of the first wavelength.

5. The method as claimed in claim 3, further comprising:
    determining a fourth quotient Q4 the fourth and second scattered radiation intensity; and
    comparing the fourth quotient with a fifth comparison value.

6. The method as claimed in claim 1, further comprising generating a fire alarm if the first quotient reaches or exceeds the first comparison value.

7. The method as claimed in claim 1, wherein radiating the light pulses of the second wavelength $\lambda_2$ and measuring the second and third scattered radiation intensity takes place only when if the first scattered radiation intensity exceeds a minimum scattered light level for the smoke detection.

8. The method as claimed in claim 1, wherein radiating of the light pulses of the first and second wavelength $\lambda_1$, $\lambda_2$ into the scattered light volume takes place at a higher repetition frequency if the first scattered radiation intensity exceeds a minimum scattered light level for the smoke detection.

9. The method as claimed in claim 1, further comprising:
    calibrating the first and second quotient to an identical ratio value; and
    calibrating the third and fourth quotient to half of the identical ratio value for scattering particles with a mean diameter in the range of 0.5 to 1.5 µm.

10. A scattered light smoke detector comprising:
    a detection unit functioning according to the scattered light principle;
        a first and second LED unit for radiating light pulses into a scattered light volume; and
    a photosensor spectrally sensitive to the first and second LED unit;
    wherein the first LED unit is arranged with the photosensor at a forward scatter angle;
    the second LED unit is arranged with the photosensor at a backward scatter angle;
    the first and second LED unit each output light pulses of both a first and second wavelength $\lambda_1$, $\lambda_2$;
    the second wavelength $\lambda_2$ is greater than the first wavelength $\lambda_1$;
    a processor-supported control unit connected to the first and second LED unit and to the photosensor;
    output means a fire alarm; and
    an electronic memory store storing a computer program comprises instructions executable by the processor-supported control unit, wherein the instructions when executed by the processor-supported control unit configure the processor to:

radiate light pulses of a first wavelength $\lambda_1$ into a scattered light volume and measuring a first scattered radiation intensity generated by forward scattering in the scattered light volume;

radiate light pulses of a second wavelength $\lambda_2$ into the scattered light volume and measuring a second scattered radiation intensity generated by forward scattering in the scattered light volume, wherein the second wavelength $\lambda_2$ is greater than the first wavelength $\lambda_1$;

determine a first quotient from the first and second scattered radiation intensity and comparing the first quotient with a first and second comparison value, wherein the first comparison value is greater than the second comparison value; and if the first quotient lies between the first and the second comparison value:
  measure a third scattered radiation intensity generated by backward scattering of the second wavelength in the scattered light volume;
  determine a second quotient from the first and third scattered radiation intensity and comparing the second quotient with a third comparison value; and
  generate a fire alarm if the second quotient exceeds the third comparison value.

11. The scattered light smoke detector as claimed in claim 10, wherein the first LED unit emits light of the first wavelength $\lambda_1$ in the range of 350 nm to 550 nm and emits light of the second wavelength $\lambda_2$ in the range of 665 nm to 1000 nm.

12. The scattered light smoke detector as claimed in claim 10, wherein the LED unit comprises a two-color light-emitting diode for outputting the light of the first and second wavelength $\lambda_1$, $\lambda_2$.

13. The scattered light smoke detector as claimed in claim 10,
  wherein the LED unit comprises two adjacently arranged and optically identically oriented single-color light-emitting diodes for outputting the light of the first and second wavelength $\lambda_1$, $\lambda_2$.

14. The scattered light smoke detector as claimed in claim 10, wherein the control unit controls the LED unit alternatingly to emit the light pulses of the first wavelength $\lambda_1$ and the second wavelength $\lambda_2$.

15. The scattered light smoke detector as claimed in claim 10, wherein:
  the LED unit comprises two single-color light-emitting diodes for emitting the light of the first and second wavelength;
  the two light-emitting diodes of the LED unit are spatially separated from one another and oriented toward the common scattered light volume at an identical scattered light angle to the photosensor.

16. A scattered light smoke detector comprising:
  a detection unit functioning according to the scattered light principle;
  an LED unit for radiating light pulses into scattered light volume;
  a first photosensor and a second photosensor both spectrally sensitive to the LED unit;
  wherein the first photosensor is arranged in relation to the LED unit at a forward scatter angle;
  the second photosensor is arranged in relation to the LED unit at a backward scatter angle;
  the LED unit outputs light pulses of a first and second wavelength $\lambda_1$, $\lambda_2$, wherein the second wavelength $\lambda_2$ is greater than the first wavelength $\lambda_1$;
  a processor-supported control unit connected to the LED unit and to the first and second photosensor;
  output means for a fire alarm; and
  an electronic memory store storing a computer program, wherein the computer program comprises instructions executable by the processor-supported control unit, wherein the instructions when executed by the processor-supported control unit configure the processor to:
  radiate light pulses of a first wavelength $\lambda_1$ into a scattered light volume and measuring a first scattered radiation intensity generated by forward scattering in the scattered light volume;
  radiate light pulses of a second wavelength $\lambda_2$ into the scattered light volume and measuring a second scattered radiation intensity generated by forward scattering in the scattered light volume, wherein the second wavelength $\lambda_2$ is greater than the first wavelength $\lambda_1$;
  determine a first quotient from the first and second scattered radiation intensity and comparing the first quotient with a first and second comparison value, wherein the first comparison value is greater than the second comparison value; and
  if the first quotient lies between the first and the second comparison value:
    measure a third scattered radiation intensity generated by backward scattering of the second wavelength in the scattered light volume;
    determine a second quotient from the first and third scattered radiation intensity and comparing the second quotient with a third comparison value; and
  generate a fire alarm if the second quotient exceeds the third comparison value.

* * * * *